United States Patent Office 3,198,748 Patented Aug. 3, 1965

3,198,748
REFRACTORY OXIDE-ALKALINE EARTH CARBONATE SUPPORTED CATALYST

Carl D. Keith, Summit, Paula M. Kenah, East Orange, and Paul N. Rylander, Newark, N.J., assignors to Engelhard Industries, Inc., Newark, N.J., a corporation of Delaware No Drawing. Filed Sept. 21, 1960, Ser. No. 57,378
11 Claims. (Cl. 252—443)

This invention relates in general to catalysts and more particularly to catalysts wherein the catalytically active material is carried by new and improved catalyst supports and to the production and use of such catalysts and catalyst supports.

Use of alkaline earth carbonates alone as catalyst supports for various reactions is known in the art. In general, these supports have been used in catalysts employed in reactions wherein acidic or neutral type supports tend to give undesired side reactions and decreased selectivity of the desired reaction. Use of the alkaline earth carbonate alone as supports has been disadvantageous, especially in macro-size catalysts for fixed bed operations, for the reason that the supports do not have sufficient strength unless they are calcined at high temperature. However, while high temperature calcining may produce stronger particles, there is an attendant considerable decrease in catalytic activity. Use of ground natural occurring minerals by themselves as supports in fixed bed catalysts is also known in the art. In general, these natural occurring minerals have high densities, low surface areas, and pore structures which are not too desirable for many reactions. Further, the natural occurring carbonate minerals are frequently associated with extraneous metal compounds which may poison added catalytic metals. Moreover, impurities present in the natural mineral carbonates may lead to undesirable side reactions. Clays have also been used alone as catalyst supports but have been unsatisfactory because resulting in catalysts of low activity.

In accordance with the present invention, it was found that catalysts having high physical strength, low densities, high surface area including pore structures very desirable for many chemical reactions, and strikingly superior catalytic activity are attained by preparing the catalysts with catalyst supports comprising a mixture of a refractory oxide and an alkaline earth carbonate, the catalytically active material being carried thereon. By reason of these properties, the catalysts are especially well adapted for use as fixed bed catalysts. Further, the catalysts have been found highly suited for use in removing free oxygen or free hydrogen from gaseous mixtures; in production of $H_2O_2$ by the catalytic reduction of a quinone; and in the removal of carbon monoxide and carbon dioxide from a gaseous mixture.

The composition of the support may be varied between about 5 and 95 weight percent, preferably between about 10 and 80 weight percent alkaline earth carbonate, with the balance the refractory oxide. The catalysts of this invention containing large or small amounts of an alkaline earth carbonate together with a refractory oxide as the support were found to have a considerably improved catalytic activity over catalysts containing clay alone as carrier support. Further, although the high alkaline earth carbonate, low refractory oxide content combinations in the supports show good physical strength, there is still higher physical strength exhibited by the low alkaline earth carbonate, high refractory oxide content combinations in the supports, such low carbonate, high refractory oxide content supports containing typically, by weight, between about 10 percent and 30 percent of the alkaline earth carbonate and the balance the refractory oxide.

The combination alkaline earth carbonate-refractory oxide catalyst supports of the invention also tend to show improvement in physical strength over use of clay alone as catalyst supports, and over use of alkaline earth carbonates alone as supports unless the carbonates are subjected to high temperature calcination. However the high temperature calcining results in a considerably decreased catalytic activity of the alkaline earth carbonate alone. By the term "refractory oxide" used herein is meant an oxide of a refractory material, which oxide of the refractory material is capable of resisting and standing up well under temperatures as high as 800° C. and even higher without detrimental effects thereto.

Examples of refractory oxides suitable for combining with the alkaline earth carbonate to form the supports are alumina including activated alumina, silica, clay, for instance, montmorillonites, kaolins, halloysites, etc., zirconia, and titania. The clays are preferred and clays low in iron content, preferably clays containing less than 1 weight percent of iron are advantageous among the clays. Suitable alkaline earth carbonates include calcium carbonate, barium carbonate and strontium carbonate.

Dimensions of the catalyst support particles of the invention will typically be between about 0.02 and 0.5 inch in diameter with the length usually somewhat longer than the diameter. For example, a 0.0625" diameter support particle prepared by extrusion will generally have a length of 0.125"–0.25".

The catalyst supports are prepared by commingling or intimately mixing together the refractory oxide, alkaline earth carbonate and water in the proportions, by weight, of preferably between about 5 and 95 percent, more preferably between about 20 and 90 percent refractory oxide, preferably between about 5 and 95 percent, more preferably between about 10 and 80 percent alkaline earth carbonate, and when the support bodies are formed by extrusion, sufficient water, preferably deionized water, to form a mix of plastic, i.e., shapeable consistency. Typically between about 10 and 30 percent of water based on total mix is employed. The refractory oxide and alkaline earth carbonate are preferably in finely-divided form and of typical particle size less than 100 mesh. The commingling is carried out at temperature of about 10°–100° C., preferably about 20°–40° C. for a period sufficient to achieve an intimate mixing of the ingredients and preferably from about 5–120 minutes, more preferably from about 15–30 minutes. The mixture is then plasticized, i.e., made plastic or of extrudable consistency by forming the same through a conventional extruder without a die or, more desirably by mixing the ingredients and plasticizing in a muller type mixer. The mixture is then formed into catalyst support bodies of the desired shape, preferably macro-size support bodies, by extrusion. It is preferred to form the catalyst support body by extrusion; however, the support may be formed by conventional tabletting. In this case, water is not added to the refractory oxide-alkaline earth carbonate mixture. In forming the preferred extrudate particles, the mixture of refractory oxide and alkaline earth carbonate and water is extruded while of extrudable consistency into a plurality of spaghetti-like strings, followed by cutting the strings into individual lengths typically of the dimensions previously disclosed, drying, and calcining the resulting extrudate particles at temperature preferably between about 650° C. and 750° C. for a period sufficient to expel the water, preferably from about 30 minutes–6 hours. These calcining temperatures are temperatures below the decomposition temperatures of the alkaline earth carbonates of the invention. The supports are then ready for preparation of the catalyst.

Examples of catalytically active materials which can be carried on the supports of the invention are the oxides and metals of the transition heavy metals of the periodic table. The transition heavy metal group is made up of the metals of groups IIIB, IVB, VB, VIB, VIIB, VIII, IB and IIB. Representative of these various groups of the transition heavy metals are platinum, palladium, rhodium, ruthenium, osmium, iridium, cobalt and nickel in group VIII; gold and silver in group IB; cadmium and zinc in IIB; manganese in VIIB; chromium, molybdenum and tungsten in VIB; vanadium and tantalum in group V; zirconium and titanium in IVB; and yttrium in group IIIB.

The platinum group metals, viz. platinum, palladium, rhodium, and ruthenium are preferred. Mixtures of the metals or metal oxides can be advantageously employed on the supports in place of the metals or metal oxides singly, if desired. The periodic table is taken from the "Periodic Chart of the Elements," revised October 1959, Merck and Co. Inc. (based on Fundamental Chemistry, 2nd edition, by H. G. Deming).

The platinum group metals and also the precious metals, namely gold and silver are deposited on the supports in concentrations preferably between about 0.01 and 10 weight percent, more preferably between about 0.1 and 1.0 weight percent, based on support. The remaining metals are preferably deposited on the support in concentrations of between about 1 and 40 weight percent, more preferably between about 5 and 15 weight percent, based on support. The catalytic material can be added to the support either prior to or after forming the support.

Preparation of the novel refractory oxide-alkaline earth carbonate supports of the invention is further illustrated by the following examples. Parts and percentages are by weight unless otherwise specified.

EXAMPLE I

The carrier was extruded in three lots as follows:

*Extrusion A.*—$SrCO_3$ powder in amount of 1500 parts, 588 parts of Ball clay, and 450 parts of deionized water were mixed in a Readco mixer. The resulting mixture was then plasticized by forcing the same through an extruder without a die, followed by extruding the plasticized mixture through a 0.065" die with the plasticized mixture containing 15.5 percent free water.

*Extrusion B.*—The procedure of extrusion A was repeated except that 3375 parts $SrCO_3$, 1320 parts Ball clay and 1050 parts deionized water were used, and the content of free water in the plasticized mixture during the final extruding was 16.5 percent.

*Extrusion C.*—The procedure of extrusion B was repeated using the same ingredients and the same proportions as in extrusion B, the difference in this extrusion being that the free water content of the plasticized mixture during the final extruding was 17.3 percent.

The three lots of extruded catalyst from extrusions A, B, and C were combined, dried at 100°–110° C., sized and calcined in a Steiner-Ives oven three hours at 550° C. The supports were then ready for preparation of the catalyst.

EXAMPLE II

The carrier was extruded in two lots as follows:

*Extrusion A.*—Bleached clay in the amount of 4630 parts, 1,000 parts calcium carbonate powder and 1470 parts deionized water were mixed in a Readco mixer followed by plasticizing by forcing the mixture through an extruder without a die. The plasticized mixture was then extruded through a 0.050" die.

*Extrusion B.*—The procedure of extrusion A of this example was repeated using the same ingredients and proportions.

The two lots of supports from extrusions A and B of this example were mixed, dried at 100–110° C., sized and calcined two hours at 650° C. The resulting supports were then ready for preparation of the catalyst.

EXAMPLE III

There was mixed in the Readco mixer 5200 parts bleached clay, 500 parts barium carbonate, and 1500 parts deionized water. The mixture was plasticized by being put through the extruder without a die, followed by extruding through a 0.050" die. The material then was dried at 100–110° C., sized and calcined two hours at 650° C. to yield supports suitable for preparation of the catalyst.

EXAMPLE IV

There was mixed 4620 parts bleached clay and 1150 parts deionized water in a Readco mixer. The resulting mixture was then plasticized by being put through the extruder without a die, followed by extruding through a 0.050" die. The resulting material was dried at 100–115° C., sized and calcined two hours at 650° C. The resulting supports were then suitable for preparation of the catalyst.

EXAMPLE V

The supports were extruded in two lots as follows:

*Extrusion A.*—Bleached clay in amount of 5500 parts, 600 parts of calcium carbonate and 1600 parts deionized water were mixed in a Readco mixer and then plasticized by being put through an extruder without a die. The plasticized mixture was then extruded through a 0.065" die.

*Extrusion B.*—The procedure of extrusion A of this example was repeated using the same ingredients and proportions thereof as in extrusion A.

The two lots of supports from extrusions A and B of this example were mixed, dried, sized, and calcined three hours at 550° C. to yield supports suitable for the preparation of catalyst.

The clay employed in Examples II–V was "Ajax P" clay (bleached) with 13.5 percent volatile matter, and the calcium carbonate used in Examples II and V was Mallinckrodt Pptd. USP light. The barium carbonate employed in Example II was Fisher Ppt'd Tech.

The catalysts of the invention may be prepared by applying a catalytically active material to the support bodies of this invention, for instance by applying a solution of a material hydrolyzable to the catalytically active material to the support material prior to forming the supports, preferably to the alkaline earth carbonate constituent prior to mixing with the refractory oxide to form the supports, or to the support bodies after forming the supports. In general, when the catalyst is to be used for liquid or high velocity gas reactions it is preferred to add the catalytically active material after forming the supports. However, in cases where a homogeneous dispersion of the catalyst material is desired throughout the support body, it is preferred to fix the catalytic metal or metal oxide on the finely divided alkaline earth carbonate prior to mixing with the refractory oxide for forming the catalyst particles. In the case of impregnating a formed alkaline earth carbonate-refractory oxide support with a compound of a metal which readily hydrolyzes, we have found that the metal will be fixed as an insoluble compound in a very thin layer on the outside surface of the support. The deposit is uniform and at a relatively low metal concentration of usually less than 1 percent (based on the support), there is very little penetration of the metal into the particle. This achieves near 100 percent utilization of the metal in processes where the effective catalyst is restricted to the outside of the macro particle, for example, in liquid phase and high gas velocity processes. The support bodies may be treated with an aqueous solution of a material hydrolyzable to a catalytically active material, for instance a hydrolyzable compound of a metal of the transition heavy metals of the periodic table, followed by hydrolyzing the hydrolyzable material on the support by heating to deposit the catalytically active material over the surface of the support body.

When adding the catalytic material to the support body before forming the supports, a solution, i.e., a solution or slurry of the material hydrolyzable to the catalytically active material is intimately mixed with the support ingredients including the refractory oxide and alkaline earth carbonate, or the alkaline earth carbonate by itself in the preferred embodiment in the proportions of these materials desired prior to shaping the catalyst.

More specifically, the catalysts are prepared by immersing, wetting or spraying the surface of the previously prepared calcined support bodies with a solution of the catalytically active material. When the material applied to the support bodies is a material hydrolyzable to a catalytically active material, for instance a hydrolyzable compound of a preferred platinum group metal, the hydrolyzable compound is applied to the surfaces of the support bodies as described followed by hydrolyzing the thus-treated support body preferably by heating the solution or body at a temperature up to about the boiling point of the solution to effect hydrolysis of the platinum group metal compound and deposit the catalytically active material over the surface of the support body. An advantageous means of depositing the catalytic metal on the support bodies is by immersing the previously prepared calcined support bodies in a bath of an aqueous solution of a hydrolyzable material, for instance, a hydrolyzable compound of a transition heavy metal, preferably a hydrolyzable compound of a platinum group metal, i.e., platinum, palladium, rhodium, ruthenium, osmium or iridium at a temperature of about 20–100° C. The support bodies are kept in the solution for a period sufficient to deposit the catalytic material on the support body, generally from about 1 minute to about 1 hour, preferably about 5–15 minutes. When the catalyst is to be used in reduced state, the thus-treated macrosize support bodies are then treated with an aqueous solution of a reducing agent, for instance sodium formate, at a temperature of about 20–100° C. for sufficient time to reduce the metal compound to the metallic state. The reduced catalyst is then washed with deionized water to remove soluble impurities and dried at a temperature of about 100°–120° C. If desired, other reducing agents such as, for instance, formaldehyde or formic acid may be used instead of the sodium formate.

Alternatively, the hydrolyzed catalyst may be washed with deionized water and dried at the temperatures stated, and if the catalyst is to be used in a reduced state, it may be reduced in the reaction system with a flowing stream of hydrogen gas. For example, palladium catalysts are reduced with flowing hydrogen at a temperature of about 20–100° C.

In cases where the catalytically active material or metal compound is not soluble in water, suitable organic solvents such as for instance ethyl, methyl or propyl alcohols, or ethers may be used for forming the solution of catalytic material for preparing the catalyst. The solution can be applied to the support bodies by spraying, wetting or immersing. The catalytic material is then deposited on the supports by evaporation of the solvent preferably by heating, and the compound may then be reduced, if desired, by heating in the hydrogen gas. In forming the solutions of the catalytic metals of this invention, any suitable soluble salts of the metals may be employed.

The following examples illustrate the preparation of catalysts using the novel alkaline earth carbonate-refractory oxide supports of the invention, parts and percentages being by weight unless otherwise stated.

EXAMPLE VI

A solution was formed of 68.6 parts $Na_2PdCl_4$ (at 36.02 percent concentration=24.75 parts Pd) in 2500 parts by volume of deionized water. The extrudate catalyst supports containing a mixture of about 75 percent $SrCO_3$ and about 25 percent Ball clay prepared according to Example I were then immersed in the aqueous solution of $Na_2PdCl_4$, mixed, and the mixture heated to near boiling to effect complete hydrolysis. The fixed palladium was then reduced by addition of about 375 parts of 20 percent sodium formate solution. The catalyst was then washed and dried at 110° C.

EXAMPLE VII

The preparation procedure of Example VI was repeated except that the materials used were 3500 parts of the extrudate catalyst supports prepared in accordance with Example II, and containing a mixture of about 20 percent $CaCO_3$ and 80 percent clay, and the aqueous solution contained 29.0 parts of $Na_2PdCl_4$ (at 36.03 percent concentration=10.5 parts Pd) and 3,000 parts of deionized water.

EXAMPLE VIII

A solution was prepared of 8.25 parts $RhCl_3$ (at 40 percent concentration=3 parts Rh+10 percent excess) and 252 parts of deionized water. The $RhCl_3$ solution was poured onto 597 parts of the extrudate catalyst supports prepared according to Example V and containing a mixture of about 10 percent calcium carbonate and about 90 percent clay, followed by mixing, heating to temperature of near boiling, washing and drying at 110° C. The catalyst was then reduced by heating in a $H_2$ stream at 300° C.

EXAMPLE IX

A solution was formed of 0.76 part $RuCl_3$ (at 39.56 percent concentration=0.3 part Ru) dissolved in 70 parts of deionized water. 100 parts of the extrudate catalyst support prepared in accordance with Example III and containing a mixture of about 10 percent $BaCO_3$ and about 90 percent clay were added to the aqueous solution of $RuCl_3$ followed by mixing, heating to near boiling, washing and drying at 100° C. The catalyst was not reduced.

EXAMPLE X

A solution was prepared of 0.644 part of $K_2PtCl_4$ (at 46.55 percent concentration=0.3 part) in 70 parts of deionized water. 100 parts of the catalyst support prepared in accordance with Example III and containing a mixture of about 10 percent $BaCO_3$ and about 90 percent clay were immersed in the $K_2PtCl_4$ solution followed by mixing, heating to near boiling, and then reducing by addition of about 10 parts of 20 percent sodium formate solution. The catalyst was then washed and dried at 110° C.

Comparative data Table I, which follows shows the improvement in physical properties of the catalysts having the combination alkaline earth oxide-refractory oxide supports of the present invention, over catalysts having supports containing clay alone.

*Table 1*

| Catalyst Composition | Catalyst Physical Propert ies | | |
|---|---|---|---|
| | Density | Surface Area, m.²/g. | Crushing Strength, lbs. |
| 0.3% Pd on $SrCO_3$ (75%)+Ball clay (25%) extrudate | 1.18 | ---------- | 4.0 |
| 0.3% Pd on $CaCO_3$ (20%)+"Ajax P" clay (80%) extrudate | 0.85 | 19.3 | 6.5 |
| 0.3% Pd on $CaCO_3$ (20%)+"Ajax P" clay (80%) extrudate | 0.86 | 17.8 | 5.1 |
| 0.3% Pd on $BaCO_3$ (10%)+"Ajax P" clay (90%) extrudate | 0.92 | 25.6 | 4.8 |
| 0.3% Pd on "Ajax P" clay extrudate | ---------- | ---------- | 3.6 |
| 0.3% Ru on $BaCO_3$ (10%)+"Ajax P" (90%) extrudate | ---------- | ---------- | 4.8 |
| 0.3% Pt on $BaCO_3$ (10%)+"Ajax P" clay (90%) extrudate | ---------- | ---------- | 5.4 |

The catalysts of the present invention containing the combination refractory oxide-alkaline earth carbonate supports are especially well adapted for use in removing free oxygen or free hydrogen from a gaseous mixture. The gaseous mixture stream containing the free oxygen and free hydrogen is passed into contact with a catalyst comprising a platinum group metal deposited on the catalyst support comprising the mixture of refractory oxide and alkaline earth carbonate, whereby the oxygen and hydrogen chemically combine. Temperatures of between about 0° C and 800° C. preferably between about 0° C. and 500° C. and pressures between about 1 atmosphere and 500 atmosphere are employed. In cases where the gaseous mixture contains a major proportion of hydrogen and small amounts of oxygen and it is desired to remove the oxygen from the mixture, it is possible to remove all or substantially all of the oxygen from the gas in one step by the catalytic contacting when the total amount of free oxygen in the gaseous mixture is less than about 4 percent. However, when the oxygen is present in the gas in amount substantially greater than 4 percent, the gaseous mixture may be recycled into contact with the catalyst of the invention one or more times, preferably with intermediate cooling. Such step by step process for the gradual elimination of the oxygen would be useful in the removal of oxygen from atmospheric air. The removal of oxygen from air is desired in the manufacture of nitrogen as the residual element of the air mixture, for the production of an inert atmosphere, or for the maintenance of an inert atmosphere.

When the gaseous mixture contains a major proportion of oxygen and small amounts of hydrogen and it is desired to remove the hydrogen from the mixture, all or substantially all of the hydrogen can be removed in one step by passage of the gaseous mixture into contact with the catalyst of the invention when the hydrogen is present in the mixture in concentrations less than about 8 percent. Where the gaseous mixture contains amounts of hydrogen substantially greater than 8 percent, the removal of the hydrogen is conducted by recycling the gaseous mixture one or more times into contact with the catalyst, preferably with intermediate cooling. The chemical combination of the oxygen and hydrogen in contact with the catalyst is a flameless combustion. Removal of hydrogen from a predominantly oxygen-containing gaseous mixture finds utility when it is desired to remove material amounts of hydrogen from a gas mixture to eliminate the danger of fire and explosion, or for generation of heat or for other reasons. Space velocities of from about 1,000–100,000, preferably from about 2,000–60,000 s.c.f.h./c.f. are employed when the gas contains a major proportion of hydrogen and small amounts of oxygen and the oxygen is to be removed; and similar space velocities are employed when the gas contains a major proportion of oxygen and small amounts of hydrogen and the hydrogen is to be removed.

The chemical combining of the oxygen and hydrogen in either case, i.e., for the removal of the free oxygen or free hydrogen is accompanied by the formation of water which can be removed from the gas, if desired or required. Such removal of water can be effected by passage of the gaseous reaction products into contact with desiccants such as calcium chloride or magnesium perchlorate, by the use of absorbents such as silica gel, activated alumina or the like, or by condensation of the water vapor by cooling.

The preferred platinum group metal deposited on catalyst supports for removing hydrogen from oxygen is platinum or palladium, with platinum especially preferred. For removing oxygen from hydrogen, catalysts containing either palladium or rhodium deposited on the catalyst supports give particularly favorable results; in most cases palladium is preferred for this application.

The ability of a given catalyst to effect removal of small amounts of oxygen from predominantly hydrogen-containing gas mixtures containing small amounts of oxygen or hydrogen from predominantly oxygen-containing gas mixtures is known as its "Deoxo activity." The "Deoxo activity" of a catalyst is determined by the formula:

$$\text{Deoxo activity}=\frac{\text{liters of gas per hour}}{\text{grams catalyst}}\times\log\frac{O_{2\,\text{in}}}{O_{2\,\text{out}}}$$

Where two numbers are given for the Deoxo activity in comparative data Table II hereafter set forth, the first represents flash activity and the second represents activity remaining at the end of the test period, which is about a half hour.

The Deoxo activity of a catalyst for removing small amounts of oxygen from a gaseous mixture containing a major proportion of hydrogen is evaluated as follows:

The predominantly hydrogen gas stream containing small amounts of oxygen as impurity is conducted at a rate of 100 liters per hour over a catalyst consisting of 0.5 percent palladium on alumina at room temperature, which converts small amounts of $O_2$ present to water which is then removed with an activated alumina drier. The flow rate is measured by the gas passing through a calibrated capillary over mineral oil containing a dye in a manometer. The gas is then passed over a tubing branch connected to an electrolytic cell containing 20 percent sodium hydroxide solution. For the standard Deoxo test 700 p.p.m. of oxygen (based on hydrogen flow) is released to the hydrogen stream as a result of a 0.3 ampere electrolysis current. The gas stream next passes through a drier and then to a stop cock which can either pass the stream through the Deoxo test reactor or bypass the reactor. The stream is then conducted through another drier and thence to a calorimeter, where heat of reaction of the free hydrogen and free oxygen on a 0.5 percent palladium on alumina catalyst is measured The Deoxo test unit contains 0.5 gram of catalyst, and when this is in the system, it serves to chemically combine part of the hydrogen and oxygen passing over it, which is thus a measure of the activity of the catalyst. The activity of the tested catalyst can thus be determined by reduction in the blank calorimeter heat effect when a catalyst is under test. The above procedure is similar for evaluating the Deoxo activity of a catalyst for removing small amounts of hydrogen from a gaseous mixture containing a major proportion of oxygen. Table II showing the Deoxo test results utilizing the various catalyst support combinations follows:

*Table II*

| Catalyst Designation | Catalyst Composition | Deoxo ($H_2$—$O_2$) Activity |
|---|---|---|
| A | 0.3% Pd on $SrCO_3$ (75%)+Ball clay (25%) extrudate. | 113–107 |
| B | 0.3% Pd on $CaCO_3$ (20%)+"Ajax P" clay (80%) extrudate. | 189–160 |
| C | 0.3% Pd on $CaCO_3$ (20%)+"Ajax P" clay (80%) extrudate. | 202–129 |
| D | 0.3% Pd on $BaCO_3$ (10%)+"Ajax P" clay (90%) extrudate. | 100–79 |
| E | 0.3% Pd on "Ajax P" clay extrudate | 13 |
| F | 0.5% Rh on $CaCO_3$ (10%)+"Ajax P" clay (90%) extrudate. | 242–182 |
| G | 0.3% Pt on $BaCO_3$ (10%)+"Ajax P" clay (90%) extrudate. | 32 |

It is readily apparent from Table II that catalysts containing the combination refractory oxide-alkaline earth carbonate supports of the present invention have improved activity for removing small amounts of oxygen from a gaseous mixture containing a major proportion of hydrogen, over the activity shown by the catalyst containing clay alone as support.

The catalysts of this invention are also well suited for effecting removal of carbon monoxide and carbon dioxide from a gaseous mixture stream containing a major proportion of hydrogen and small amounts of carbon monoxide and carbon dioxide. The gaseous mixture is passed into contact with the catalyst at temperatures between about 200° C. and 500° C., preferably between about 250° C. and 450° C. at pressures of between about 1 atmosphere and 300 atmospheres, at space velocities of from about 1,000–20,000, preferably from about 2,000–10,000 s.c.f.h./c.f. By reason of the catalyst of the invention, all or substantially all of the carbon monoxide and carbon dioxide is removed from the gas stream. The removal of the carbon monoxide and carbon dioxide takes place by reaction of these two compounds with a portion of the hydrogen to form methane and water. It was surprising and unexpected that the removal of the carbon dioxide and carbon monoxide was effected without any significant reversal of the reaction, as a result of the presence in the gas of increasing amounts of methane formed during the reaction.

Use of the combination refractory oxide-alkaline earth carbonate supported catalysts of the invention for effecting removal of substantially all CO and $CO_2$ from a gaseous mixture containing a major proportion of hydrogen is illustrated by the following example.

EXAMPLE XI

An inlet gas stream containing by volume 2.4 percent CO, 0.11 percent $CO_2$ and 1.56 percent $CH_4$ with the balance hydrogen was passed downwardly over 20 parts by volume of the barium carbonate-clay supported ruthenium catalyst prepared in accordance with Example IX placed in a vertical ¾" I.D. stainless steel pipe at 3,000 v.h.s.v., a linear velocity of 0.5 ft./min., a pressure of 15 pounds p.s.i.g., and 285° C. temperature. 40 parts by volume of ⅛" activated alumina pellets were placed above the catalyst in the reactor, the alumina pellets having previously been shown to have no activity for the methanation reaction to remove the CO and $CO_2$ from the gas mixture and being used solely to remove catalyst poisons from the inlet gas stream, particularly Fe carbonyls. The outlet gas stream was found to contain <5 p.p.m. CO, <20 p.p.m. $CO_2$ and 4.1 percent $CH_4$ with the balance $H_2$ and $H_2O$.

Further, the combination refractory oxide-alkaline earth carbonate supported catalysts of the present invention are eminently adapted for use in the manufacture of $H_2O_2$ by the catalytic reduction of a quinone, followed by autoxidation of the hydroquinone to yield $H_2O_2$ with cyclic repetition of this process. The manufacture of $H_2O_2$ by the autoxidation process is described in "Hydrogen Peroxide," by Schumb, Satterfield & Wentworth (American Chemical Society Monograph, No. 128), particularly in pages 77–81.

2-ethyl anthraquinone used in this process may be dissolved in a 50:50 mixture of benzene and secondary alcohols of chain length $C_7$–$C_{11}$. Other solvents recommended include mixtures of benzene with organic phosphonates, mixtures of benzene with organic triphosphate esters, mixtures including esters of cyclohexanol or an alkyl cyclohexanol, and mixtures of benzene, hexane and octyl alcohol. Other anthraquinones or quinones of a different type together with hydrazobenzenes such as p-hydrazobenzene may be used as oxygen-carrying solute. It is known that Raney nickel may be used as catalyst for this process but palladium supported on activated alumina was preferred.

The superiority of the refractory oxide-alkaline earth carbonate supported catalysts of the present invention over a prior art catalyst consisting of palladium supported on activated alumina in the production of $H_2O_2$ by the catalytic reduction of a quinone followed by autoxidation of the hydroquinone is shown by the following example. The quinone used was a working solution of an alkyl-substituted anthraquinone of a type previously discussed herein. Parts and percentages are by weight unless otherwise specified.

EXAMPLE XIII

A bath reaction of the pelleted catalyst was carried out with a Standard Oil Company (Indiana) Magnedash shaking apparatus, operating at 25° C. and atmospheric pressure. Each test used 50 parts by volume of the dissolved alkyl-substituted anthraquinone and 0.500 part of catalyst. The catalyst was placed in a stainless steel wire mesh basket attached to a stainless steel rod with a soft iron core covered by stainless steel on the upper end. The basket was moved in and out of the working solution at a rate of 30 cycles per minute by making and breaking current through a solenoid surrounding the iron core. The rate of $H_2$ uptake was measured with a conventional gas burette attached to the system containing $H_2$ over water.

Two $CaCO_3$-clay supported catalysts and one $BaCO_3$-clay supported catalyst prepared in accordance with the present invention were subjected to this test. The composition of each of the $CaCO_3$-clay supported catalysts was 0.3 percent Pd on an extrudate support containing 20 percent $CaCO_3$ and 80 percent "Ajax P" clay, one of these $CaCO_3$-clay supported catalysts being designated catalyst B and the other catalyst C. The composition of the $BaCO_3$-clay supported catalyst was 0.3 percent Pd on an extrudate support containing 10 percent $BaCO_3$ and 90 percent "Ajax P" clay, this catalyst being designated catalyst D. The commercial $H_2O_2$ catalyst of the prior art consisting of 0.3 percent Pd on activated alumina was also subjected to the test and was designated catalyst J. The rates of $H_2$ uptake obtained using these catalysts were as follows:

| | Ml. $H_2$ |
|---|---|
| End of 40 minutes | |
| Catalyst B | 110 |
| Catalyst C | 184 |
| Catalyst D | 168 |
| Prior art Catalyst J | 27 |
| End of 60 minutes | |
| Catalyst B | 204 |
| Catalyst C | 279 |
| Catalyst D | 269 |
| Prior art Catalyst J | 38 |
| End of 76 minutes | |
| Catalyst B | 270 |
| Catalyst C | 320 |
| Catalyst D | 330 |
| Prior art Catalyst J | 48 |

The striking superiority of catalysts B, C and D of the invention over the prior art catalyst J in the production of $H_2O_2$ by the catalytic reduction of a quinone is readily apparent from the above data.

It will be obvious to those skilled in the art that many modifications may be made within the scope of the present invention without departing from the spirit thereof, and the invention includes all such modifications.

What is claimed is:

1. A method for preparing a catalyst which comprises impregnating an alkaline earth carbonate with an aqueous solution of a compound of a metal selected from the group consisting of the transition heavy metals of the periodic table, said compound being hydrolyzable to a catalytically active material, hydrolyzing the hydrolyzable compound to deposit the catalytically active material in the alkaline earth carbonate, then intimately admixing a refractory oxide selected from the group consisting of alumina, silica, clay, zirconia and titania with the alkaline earth carbonate the alkaline earth carbonate and refractory oxide being admixed together in proportions, by weight, between about 5 percent and 95 percent of the alkaline earth carbonate and the balance the refractory oxide, and forming the admixture while of plastic consistency into a body of the desired shape.

2. A method for preparing a catalyst which comprises mixing together a refractory oxide selected from the group consisting of alumina, silica, clay, zirconia and titania, an alkaline earth carbonate, and water, the alkaline earth carbonate and refractory oxide being mixed together in the proportions, by weight, between about 5 percent and 95 percent of the alkaline earth carbonate and the balance the refractory oxide, forming the mixture while of plastic consistency into a catalyst support body of the desired shape, calcining the shaped support body at a temperature below the decomposition temperature of the alkaline earth carbonate to expel the water, treating the calcined support body with a solution of a compound of a metal selected from the group consisting of the transition heavy metals of the periodic table, said compound being hydrolyzable to a catalytically active material, and hydrolyzing the hydrolyzable compound on the support body to deposit the catalytically active material on the support body.

3. A method for preparing a catalyst which comprises intimately mixing together a refractory oxide selected from the group consisting of alumina, silica, clay, zirconia and titania, an alkaline earth carbonate and water, the alkaline earth carbonate and refractory oxide being mixed together in the proportion, by weight, between about 5 percent and 95 percent of the alkaline earth carbonate and the balance the refractory oxide, forming the mixture while of plastic consistency into a catalyst support body of the desired shape, calcining the shaped support body at a temperature below the decomposition temperature of the alkaline earth carbonate to expel the water, wetting the surface of the calcined support body with an aqueous solution of a hydrolyzable compound of a platinum group metal, and hydrolyzing the platinum group metal compound by heating to deposit a reducible compound of the platinum group metal over the surface of the support body.

4. The method according to claim 3 wherein the reducible platinum group metal compound on the support body is subsequently reduced to the metallic platinum group metal.

5. A method for preparing macro-size catalyst particles adapted for use in fixed bed catalytic operations, which comprises intimately mixing together by weight, between about 20 percent and 90 percent of a refractory oxide selected from the group consisting of alumina, silica, clay, zirconia and titania, between about 10 percent and 80 percent of an alkaline earth carbonate, and water in amount sufficient to form an extrudable mixture of plastic consistency, extruding the mixture while of plastic consistency into a plurality of spaghetti-like strings, cutting the string into individual lengths to form macro-size extrudate bodies, calcining the macro-size extrudate bodies at a temperature below the decomposition temperature of the alkaline earth carbonate to expel the water therefrom, immersing the calcined macro-size support bodies in a bath of an aqueous solution of a hydrolyzable salt of a platinum group metal, hydrolyzing the platinum group metal salt by heating the solution at a temperature up to about the boiling point of the aqueous solution to deposit a reducible compound of the platinum group metal on the support body, and then reducing the reducible platinum group metal compound on the support body to obtain a metallic platinum group metal thereon.

6. A method for preparing a catalyst support which comprises intimately mixing together a refractory oxide selected from the group consisting of alumina, silica, clay, zirconia and titania and an alkaline earth carbonate, the alkaline earth carbonate and refractory oxide being mixed together in the proportions, by weight, between about 5 percent and 95 percent of the alkaline earth carbonate and the balance the refractory oxide, forming the mixture into a catalyst support body of the desired shape, and calcining the shaped catalyst support at a temperature below the decomposition temperature of the alkaline earth carbonate.

7. A method for preparing a macro-size catalyst support body which comprises intimately mixing together, by weight, between about 5 percent and 95 percent of a refractory oxide selected from the group consisting of alumina, silica, clay, zirconia and titania, between about 5 percent and 95 percent of an alkaline earth carbonate, and between about 10 percent and 30 percent of water based on total mix, forming the mixture while in plastic condition into a macro-size support body of the desired shape, and calcining the support body at a temperature below the decomposition temperature of the alkaline earth carbonate to expel the water and obtain a porous support body of high surface area and high physical strength.

8. A method for preparing a catalyst which comprises essentially intimately mixing together a refractory oxide selected from the group consisting of alumina, silica, clay, zirconia and titania and an alkaline earth carbonate and forming a catalyst support of the intimate mixture, the alkaline earth carbonate and refractory oxide being mixed together in the proportions, by weight, between about 5 percent and 95 percent of the alkaline earth carbonate and the balance the refractory oxide, and incorporating a catalytically active material selected from the group consisting of the oxides and metals of the transition heavy metals of the periodic table on the support intimate mixture.

9. A method for preparing a catalyst support which comprises intimately mixing together a refractory oxide selected from the group consisting of alumina, silica, clay, zirconia and titania, an alkaline earth carbonate and water, the alkaline earth carbonate and refractory oxide being mixed together in the proportions of, by weight, between about 5 percent and 95 percent of the alkaline earth carbonate and the balance the refractory oxide, forming the mixture while of plastic consistency into a catalyst support body of the desired shape, and calcining the shaped catalyst support body at a temperature below the decomposition temperature of the alkaline earth carbonate to expel the water therefrom.

10. The method of claim 9 wherein the alkaline earth carbonate is selected from the group consisting of calcium, barium and strontium carbonates.

11. A method for preparing a catalyst support which comprises intimately dry-mixing together a refractory oxide selected from the group consisting of alumina, silica, clay, zirconia and titania and an alkaline earth carbonate, the alkaline earth carbonate and refractory oxide being mixed together in the proportions, by weight between about 5 percent and 95 percent of the alkaline earth carbonate and the balance the refractory oxide, and tabletting the resulting dry mixture into a support body.

References Cited by the Examiner

UNITED STATES PATENTS

| | | | |
|---|---|---|---|
| 2,173,111 | 9/39 | Hasche | 252—443 |
| 2,244,196 | 6/41 | Herbert | 252—459 |
| 2,587,599 | 3/52 | Corson et al. | 252—443 |
| 2,825,701 | 3/58 | Endler et al. | 252—443 |
| 2,826,480 | 3/58 | Webster | 23—2 |
| 2,885,442 | 5/59 | McCulloch et al. | 252—443 |
| 2,930,765 | 3/60 | Cooper et al. | 252—473 |
| 2,930,766 | 3/60 | Lacey | 252—473 |
| 2,970,034 | 1/61 | Andersen et al. | 23—2 |
| 3,087,966 | 4/63 | Currier et al. | 252—459 X |

MAURICE A. BRINDISI, *Primary Examiner.*

JULIUS GREENWALD, *Examiner.*